United States Patent [19]
Söllradl et al.

[11] Patent Number: 6,022,904
[45] Date of Patent: Feb. 8, 2000

[54] RTV-2 SILICONE FOAMS WITH LOW COMPRESSION SET

[75] Inventors: Herbert Söllradl, Emmerting, Germany; Franz Neuhauser, Geretsberg, Austria; Klaus-Michael Matejcek; Berndt Stadelmann, both of Burghausen, Germany

[73] Assignee: Wacker—Chemie, Munich, Germany

[21] Appl. No.: 09/256,793

[22] Filed: Feb. 24, 1999

[30] Foreign Application Priority Data

Feb. 26, 1998 [DE] Germany .............. 198 08 117

[51] Int. Cl.[7] ................................. C08J 9/02
[52] U.S. Cl. ........................ 521/154; 521/91; 521/92
[58] Field of Search ............... 521/154, 91, 92

[56] References Cited

U.S. PATENT DOCUMENTS

| | | |
|---|---|---|
| 3,261,801 | 7/1966 | Wilbur . |
| 3,468,835 | 9/1969 | Loraine et al. . |
| 3,715,334 | 2/1973 | Quarstedt . |
| 3,814,730 | 6/1974 | Tullos et al. . |
| 3,865,778 | 2/1975 | Christie . |
| 4,394,317 | 7/1983 | McAfee et al. . |
| 5,104,919 | 4/1992 | Okami et al. . |

FOREIGN PATENT DOCUMENTS

| | | |
|---|---|---|
| 0 010 708 | 5/1980 | European Pat. Off. . |
| 0 278 157 | 8/1988 | European Pat. Off. . |
| 0 455 078 | 11/1991 | European Pat. Off. . |
| 0 377 185 B1 | 3/1995 | European Pat. Off. . |
| 0 582 299 B1 | 11/1995 | European Pat. Off. . |
| 0 691 365 B1 | 4/1998 | European Pat. Off. . |
| 33 19 251 | 4/1984 | Germany . |
| 41 00 217 A1 | 7/1992 | Germany . |
| 196 31 120 A1 | 2/1998 | Germany . |

OTHER PUBLICATIONS

Derwent Abstract corresponding to EP 0691365, AN 96–059708 [07].
Derwent Abstract corresponding to DE 4100217, AN 92–235284 [29].
Ullmann Enzyklogädie der technischen Chemie, 4th edit., vol. 21, p. 525, Verlag Chemie: 1982.
W. Hechtl, Chemie and Technologie des Kalthärtenden Siliconkautschuks, in Silicone, Chemie und Technologie, S49H, Vulkanverlag 1989.
Ullmanns Encyclopedia of Ind. Chem., 5th Edn., vol. A5, p. 323, Verlag Chemie 1993, Weinheim, Germany.
Ullmanns Encyclopedia of Ind. Chem., 5th Edn., vol. A24, p. 72, Verlag Chemie 1993, Weinheim, Germany.
Ullmanns Encyclopedia of Ind. Chem., 4th Edn., vol. 21, pp. 522 and 525, Verlag Chemie 1982, Weinheim., Germany.
Derwent Abstract (98–102893/10) corresponding to DE 196 31 120.

*Primary Examiner*—Morton Foelak
*Attorney, Agent, or Firm*—Brooks & Kushman P.C.

[57] ABSTRACT

The present invention relates to compositions which crosslink to give elastomers, which are based on component (A) comprising polyorganosiloxane (I) having at least two alkenyl groups per molecule, at least one hydroxyl-group-containing compound and a metallic catalyst (V) and component (B) comprising polyorganosiloxane (II) having at least two silicon-bonded hydrogen atoms and organic sulfur compound (VI).

20 Claims, No Drawings

RTV-2 SILICONE FOAMS WITH LOW COMPRESSION SET

TECHNICAL FIELD

The invention relates to silicone foams, to a process for their production, to compositions suitable for preparing them, to foam articles, and to a process for production of such articles.

BACKGROUND ART

Compositions which crosslink to give elastomers and which are intended to have low compression set are known in the art.

DE 41 00 217 (Degussa AG) discloses that thiocyanato-propyltrialkoxysilanes can bring about an improvement in the compression set of molding compositions which can undergo peroxidic vulcanization when exposed to heat. It is said here that the organosilicon compounds can be used in isolation or after being converted using a filler. It is likewise known from DE 33 19 251 (Degussa AG) that isothiuronium compounds may be used instead of thiourea derivatives for vulcanizable halogen rubber mixtures. The resultant vulcanizates have better physical properties than comparable halogen rubbers without isothiuronium compounds in strength, modulus, abrasion and compression set.

In EP 0 278 157 (Shin Etsu Chemical Co., Ltd.) thiocarbamyl-functional organosilanes have been added to improve compression set to rubbers which can be vulcanized with organic sulfur compounds or with organic peroxides.

Other proposals for improving compression set are based on the use of additives, such as barium peroxide, barium oxide or magnesium oxide (U.S. Pat. No. 3,261,801, U.S. Pat. No. 3,468,838 and U.S. Pat. No. 3,865,778) and on the use of polycarbodiimide-polysiloxane copolymers (EP 0 010 708), which give strongly colored products.

The above-mentioned processes for improving compression set relate to rubbers which can be crosslinked using organic sulfur compounds or using organic peroxides, to give elastomers.

In contrast, organopolysiloxane compositions are crosslinked by an addition reaction, preferably a hydrosilylation reaction of vinyl-containing siloxanes catalyzed by hydrosilylation catalysts, including a wide variety of platinum compounds. Compounds hitherto described for improving compression set in addition-crosslinking systems are iron-manganese spinels of the empirical formula $Fe_yMn_zO_4$ (Wacker Silicones: EP 582 299), triazole compounds (Shin Etsu Chemical Co., Ltd.: U.S. Pat. No. 5,104,919), vinyl-specific organic peroxides >0.2% by weight (Dow Corning Co.: EP 0 377 185) and transition metal chalcogenides (Bayer AG: EP 0 455 078). The above-mentioned compositions have the disadvantage of still not providing addition-crosslinking compositions with low compression set values.

In EP 0 691 365 (Ernst Sonderhoff GmbH & Co), the compression set of foams is improved by increasing the Pt content and annealing for from 15 to 20 minutes at from 120 to 150° C. This process has the disadvantage of requiring an additional heat treatment, and also an increased amount of Pt as catalyst.

SUMMARY OF THE INVENTION

It is an object of the invention to overcome the disadvantages of the prior art and in particular to provide silicone foam elastomers which have low compression set without heat treatment, and also with high reproducibility of the same after storage.

DESCRIPTION OF THE PREFERRED EMBODIMENTS

The invention provides compositions which crosslink to give elastomers, based on component (A) comprising polyorganosiloxane (I) having at least two alkenyl groups per molecule, at least one hydroxyl-group-containing compound and a metallic catalyst (V) and component (B) comprising polyorganosiloxane (II) having at least two silicon-bonded hydrogen atoms and organic sulfur compound (VI).

Component (A) comprises polyorganosiloxane (I) and at least one hydroxyl-group-containing compound, which may preferably be polyorganosiloxane (III) or a monohydric or polyhydric alcohol, water, a silanol or other compounds (IV) containing hydroxyl groups or any desired mixtures of (III) and compounds (IV). Polyorganosiloxane (I) of the novel silicone foam compositions is a polyorganosiloxane containing at least two alkenyl groups per molecule and having a viscosity at 25° C. in the range preferably from 0.5 to 500 Pa·s, more preferably from 1 to 100 Pa·s and most preferably from 2 to 50 Pa·s. The amounts of polyorganosiloxane (I) used are preferably from 1 to 98% by weight, more preferably from 10 to 95% by weight and most preferably from 20 to 90% by weight, where all of the amounts given in % by weight are based on the entire composition.

Polyorganosiloxane (III) of the novel silicone foam compositions is preferably a polyorganosiloxane containing at least two hydroxyl groups per molecule and having a viscosity at 25° C. in the range preferably from 1 to 100,000 mPa·s, more preferably from 10 to 10,000 mPa·s and most preferably from 50 to 250 mPa·s. The amounts of polyorganosiloxane (III) used are preferably from 1 to 95% by weight, more preferably from 1 to 50% by weight, and most preferably from 2 to 20% by weight.

Component (A) may also comprise other additives as listed below.

Component (B) comprises the polyorganosiloxanes (II) and organic sulfur compound (VI) and preferably also polyorganosiloxanes (I) and (III), and may also comprise other additives as listed below.

Polyorganosiloxane (II) of the novel silicone foams is a polyorganosiloxane containing at least two Si-H groups per molecule and having a viscosity at 25° C. in the range preferably from 10 to 10,000 mPa·s, particularly preferably from 10 to 50 mPa·s.

The amounts of polyorganosiloxane II used are from 1 to 50% by weight, preferably from 2 to 30% by weight and particularly preferably from 2 to 15% by weight.

Polyorganosiloxane (I) is composed of units of the formula

where a is 0, 1 or 2 and b is 0, 1, 2 or 3, with the proviso that at least two radicals R are present in every molecule and (a+b)<4.

R is preferably an alkenyl group. The alkenyl groups selected may be any of the alkenyl groups which can undergo a hydrosilylation reaction with an SiH-functional crosslinking agent. Preference is given to the use of alkenyl groups having from 2 to 6 carbon atoms such as vinyl, allyl, methallyl, 1-propenyl, 5-hexenyl, ethenyl, butadienyl, hexadienyl, cyclopentenyl, cyclopentadienyl, cyclohexenyl, preferably vinyl or allyl.

$R^1$ is preferably a substituted or unsubstituted, aliphatically saturated or aromatic, monovalent hydrocarbon radical having from 1 to 10 carbon atoms, preferably from 1 to 6 carbon atoms. Examples are alkyl groups, preferably methyl, ethyl, propyl, butyl and hexyl, cycloalkyl groups such as cyclopentyl, cyclohexyl and cycloheptyl; aryl and alkaryl groups such as phenyl, tolyl, xylyl, mesityl, benzyl, beta-phenylethyl and naphthyl, and halogen-substituted groups such as 3,3,3-trifluoropropyl, o-, p- and m-chlorophenyl, bromotolyl and beta-cyanoethyl.

The alkenyl groups may be bonded in any position in the polymer chain, in particular on the terminal silicon atoms.

Polyorganosiloxane (I) may also be a mixture of different polyorganosiloxanes containing alkenyl groups, differing, for example, in the content of alkenyl groups, in the type of alkenyl group, or structurally.

The structure of the polyorganosiloxanes containing alkenyl groups may be linear or branched. Branched polyorganosiloxanes contain, besides monofunctional units, such as $RR^1_2SiO_{1/2}$ and $R^1_3SiO_{1/2}$, and bifunctional units, such as $R^1_2SiO_{2/2}$ and $RR^1SiO_{2/2}$, trifunctional units, such as $R^1SiO_{3/2}$ and $RSiO_{3/2}$, and/or tetrafunctional units of the formula $SiO_{4/2}$, where R and $R^1$ are as defined above. The content of these tri- and/or tetrafunctional units which produce branched polyorganosiloxanes should not significantly exceed 20 mol %. The polyorganosiloxane containing alkenyl groups may also contain units of the general formula —$OSi(R^2R^3)R^4Si(R^2R^3)O$—, where both $R^2$ and $R^3$ are as defined above for R and $R^1$, and $R^4$ is a bivalent organic radical, such as ethylene, propylene, phenylene, biphenylene or polyoxymethylene. Units of this type may be present in polyorganosiloxane (I) in proportions of up to 50 mol %.

Particular preference is given to the use of polydimethylsiloxanes containing vinyl groups and having molecules of the formula

$(ViMe_2SiO_{1/2})_2(ViMeSiO)_a(Me_2SiO)_b$ where a is zero or a non-negative number and b is a non-negative number and the following relationship is fulfilled: 50<(a+b)<2200, preferably 200<(a+b)<1000.

Polyorganosiloxane (II) is used as crosslinking agent in the addition-crosslinking of the novel silicone rubber composition and is preferably an SiH-functional polyorganosiloxane composed of units of the following formula

$H_cR^1_dSiO_{(4-c-d)/2}$ where c is 0, 1 or 2 and d is 0, 1, 2 or 3, with the provisos that (c+d)<4 and that at least two silicon-bonded hydrogen atoms are present in each molecule, and $R^1$ is as defined above.

Preference is given to the use of a polyorganosiloxane containing three or more SiH bonds per molecule. If a polyorganosiloxane (II) is used which has only two SiH bonds per molecule, the polyorganosiloxane (I) containing alkenyl groups preferably contains at least three alkenyl groups per molecule.

Polyorganosiloxane (II) is used as crosslinking agent. The hydrogen content of the crosslinking agent, which is based exclusively on the hydrogen atoms directly bonded to silicon atoms, is in the range from 0.002 to 1.7% by weight of hydrogen, preferably from 0.1 to 1.7% by weight of hydrogen.

Polyorganosiloxane (II) preferably contains at least three and preferably not more than 600 silicon atoms per molecule. Particular preference is given to the use of SiH crosslinking agents which contain from 4 to 200 silicon atoms per molecule.

The structure of polyorganosiloxane (II) may be linear, branched, cyclic or network-like. Linear and cyclic polyorganosiloxanes (II) are composed of units of the formula $HR^1_2SiO_{1/2}$, $R^1_3SiO_{1/2}$, $HR^1SiO_{2/2}$ and $R^1_2SiO_{2/2}$, where $R^1$ is as defined above. Branched and network-like polyorganosiloxanes (II) additionally contain trifunctional units, such as $HSiO_{3/2}$ and $R^1SiO_{3/2}$ and/or tetrafunctional units of the formula $SiO_{4/2}$. As the content of tri- and/or tetrafunctional units increases, these crosslinking agents have a network-like, resin-like structure. The organic radicals $R^1$ present in polyorganosiloxane (II) are usually selected in such a way that these are compatible with the organic radicals present in polyorganosiloxane (I), so that constituents (I), (II) and (III) are miscible.

The crosslinking agents used may also be combinations or mixtures of the polyorganosiloxanes (II) described here.

Particularly preferred polyorganosiloxanes (II) have the formula

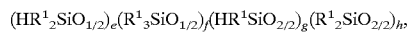

$(HR^1_2SiO_{1/2})_e(R^1_3SiO_{1/2})_f(HR^1SiO_{2/2})_g(R^1_2SiO_{2/2})_h,$ where the non-negative integers e, f, g and h fulfill the following relationships: (e+f)=2, (e+g)>2 and 5<(g+h)<200, and $R^1$ is as defined above, and the units indicated by e, f, g and h may occur in any desired sequence.

Polyorganosiloxane (II) is preferably present in the curable silicone foam in an amount which gives a molar ratio of SiH groups to alkenyl groups of preferably from 0.5 to 5, particularly preferably from 1.0 to 3.0.

Polyorganosiloxane (III) is composed of units of the formula

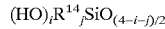

$(HO)_iR^{14}_jSiO_{(4-i-j)/2}$ where i is 0, 1 or 2 and j is 0, 1, 2 or 3, with the proviso that at least two radicals R are present in each molecule and (i+j)<4. The hydroxyl groups of polyorganosiloxane (III) react with excess Si-H groups of the crosslinking agent to form an Si—O—Si bond and also eliminating hydrogen, which is required for foaming.

$R^{14}$ is preferably a substituted or unsubstituted, aliphatically saturated or aromatic, monovalent hydrocarbon radical having from 1 to 10 carbon atoms, preferably from 1 to 6 carbon atoms. Examples are alkyl groups, preferably methyl, ethyl, propyl, butyl and hexyl, cycloalkyl groups such as cyclopentyl, cyclohexyl and cycloheptyl; aryl and alkaryl groups such as phenyl, tolyl, xylyl, mesityl, benzyl, beta-phenylethyl and naphthyl, and halogen-substituted groups such as 3,3,3-trifluoropropyl, o-, p- and m-chlorophenyl, bromotolyl and beta-cyanoethyl.

HO is a hydroxyl group. The hydroxyl groups may be bonded in any position in the polymer chain, in particular on the terminal silicon atoms.

Polyorganosiloxane (III) may also be a mixture of different polyorganosiloxanes containing hydroxyl groups, differing, for example, in the content of hydroxyl groups and/or structurally.

The structure of the polyorganosiloxanes containing hydroxyl groups may be linear or branched. Branched polyorganosiloxanes contain, besides monofunctional units, such as $HOR^{14}_2SiO_{1/2}$ and $R^{14}_3SiO_{1/2}$, and bifunctional units, such as $R^{14}_2SiO_{2/2}$ and $HOR^{14}_2SiO_{2/2}$, trifunctional units, such as $R^{14}SiO_{3/2}$ and $HOSiO_{3/2}$, and/or tetrafunctional units of the formula $SiO_{4/2}$, where $R^{14}$ is as defined above. The content of these tri- and/or tetrafunctional units which produce branched polyorganosiloxanes should not significantly exceed 20 mol %. The polyorganosiloxane containing hydroxyl groups may also contain units of the general formula —$OSi(R^{15}R^{16})R^{17}Si(R^{15}R^{16})O$—, where both $R^{15}$ and $R^{16}$ are as defined above for $R^{14}$, and $R^{17}$ is a bivalent organic radical, such as ethylene, propylene, phenylene, biphenylene or polyoxymethylene. Units of this type may be present in polyorganosiloxane (III) in proportions of up to 50 mol %.

Particular preference is given to the use of polydimethylsiloxanes containing hydroxyl groups and having molecules of the formula $$(HOMe_2SiO_{1/2})_2(HOMeSiO)_i(Me_2SiO)_j$$

where Me is methyl, where i is zero or a non-negative number and j is as defined above and the following relationship is fulfilled: $20<(i+j)<2200$, preferably $40<(i+j)<750$, where the units indicated by i and j may occur in any desired sequence.

The compound containing at least one hydroxyl group may be a compound (IV) which affects foaming behavior by reacting with H—Si functions in compound (II) with elimination of hydrogen without contributing to the crosslinking. Such compounds include alcohols $R^{18}$—OH, water, silanols and other compounds containing OH groups.

Compound (IV) is preferably present in amounts of from 0.005 to 0.1% by weight, particularly preferably from 0.005 to 0.05% by weight and very particularly preferably from 0.005 to 0.003% by weight, based on the total weight of the composition.

The compound containing at least one hydroxyl group is preferably a monohydric or polyhydric alcohol (IV), composed of units of the formula $$R^{18}(OH)_m.$$

If m=1 (monoalcohol) $R^{18}$ is a substituted or unsubstituted, aliphatically saturated or aromatic, monovalent hydrocarbon radical having from 1 to 10 carbon atoms, preferably from 1 to 6 carbon atoms, or hydrogen (in the case of water). Examples are alkyl groups, preferably methyl, ethyl, propyl, butyl and hexyl, cycloalkyl groups, such as cyclopentyl, cyclohexyl and cycloheptyl; aryl and alkaryl groups, such as phenyl, tolyl, xylyl, mesityl, benzyl, beta-phenylethyl and naphthyl, and halogen-substituted groups, such as 3,3,3-trifluoropropyl, o-, p- and m-chlorophenyl, bromotolyl and beta-cyanoethyl.

If m>1 it is a polyhydric alcohol containing the structures:

$$[CH_2]_x[CHOH]_o[CH_2OH]_2.$$

Preferred examples are glycol (x=0, o=0) and glycerol (x=0, o=1).

The compound containing at least one hydroxyl group may also preferably be any desired mixture of a polyorganosiloxane (III) having at least two hydroxyl groups per molecule and a monohydric or polyhydric alcohol, water, silanol or other compounds (IV) containing hydroxyl groups. The compounds (III) and the compounds (IV) may be mixed in any desired ratio within the amounts given for these.

The metallic catalyst (V), which is preferably present in component (A), serves for the addition reaction (hydrosilylation) between the alkenyl groups of polyorganosiloxane (I) and the silicon-bonded hydrogen atoms in polyorganosiloxane (II). A wide variety of suitable hydrosilylation catalysts (V) has been described in the literature. In principle use may be made of any of the hydrosilylation catalysts usually used in addition-crosslinking silicone rubber compositions.

Besides this the catalyst serves for the reaction of the hydroxyl groups in polyorganosiloxane (III) and, respectively, in the compounds (IV) containing hydroxyl groups with the silicon-bonded hydrogen atoms in polyorganosiloxane (II).

Hydrosilylation catalysts (V) may be metals, such as platinum, rhodium, palladium, ruthenium or iridium, preferably platinum, which may, if desired, have been fixed to finely divided support materials.

Preference is given to the use of platinum and platinum compounds. Particular preference is given to platinum compounds which are soluble in polyorganosiloxanes. Examples of soluble platinum compounds which may be used are the platinum-olefin complexes of the formulae $(PtCl_2 \cdot olefin)_2$ and $H(PtCl_3 \cdot olefin)$, where use is preferably made of alkenes having from 2 to 8 carbon atoms, such as ethylene, propylene, isomers of butene and of octene, or cycloalkenes having from 5 to 7 carbon atoms, such as cyclopentene, cyclohexene or cycloheptene. Other soluble platinum catalysts are the platinum-cyclopropane complex of the formula $(PtCl_2 \cdot C_3H_6)_2$, the reaction products of hexachloroplatinic acid with alcohols and with ethers and aldehydes or mixtures of these, and the reaction product of hexachloroplatinic acid with methylvinylcyclotetrasilane in the presence of sodium bicarbonate in ethanolic solution. Preference is given to finely divided platinum on support materials such as silica or alumina, or on activated wood charcoal and/or animal charcoal, platinum halides, such as $PtCl_4$, hexachloroplatinic acid and $Na_2PtCl_4 \cdot nH_2O$, platinum-olefin complexes, e.g. those with ethylene, propylene or butadiene, platinum-alcohol complexes, platinum-styrene complexes, as described in U.S. Pat. No. 4,394,317, platinum-alcoholate complexes, platinum-acetylacetonates, reaction products of chloroplatinic acid and monoketones, e.g. cyclohexanone, methyl ethyl ketone, acetone, methyl n-propyl ketone, diisobutyl ketone, acetophenone or mesityl oxide, or also platinum-vinylsiloxane complexes, which have been described, for example, in U.S. Pat. Nos. 3,715,334, 3,775,452 and 3,814,730, such as platinum-divinyltetramethyldisiloxane complexes, with or without detectable amounts of inorganic halogen, in amounts sufficient to promote the curing of the formulation at a temperature from room temperature to 250° C., where the organohydridosiloxane and the hydrosilylation catalyst have been arranged in different parts of the multipart curable formulation. Particular preference is given to complexes of platinum with vinylsiloxanes, such as symdivinyltetramethyldisiloxane.

The hydrosilylation catalyst (V) may also be used in microencapsulated form, where the finely divided solid comprising the catalyst and which is insoluble in the polyorganosiloxane is, for example, a thermoplastic (e.g., polyester resin, silicone resin). The hydrosilylation catalyst may also be used in the form of an inclusion compound, for example in a cyclodextrin.

The amount of the hydrosilylation catalyst used depends on the desired rate of crosslinking, and also on cost considerations. With the usual platinum catalysts the content of platinum metal in the curable silicone foam is from 0.1 to 500 ppm by weight (ppm=parts per million), preferably from 10 to 100 ppm by weight. Otherwise the catalyst is used, if desired, together with an inhibitor, preferably in amounts of from 0.01 to 5% by weight.

The sulfur compound (VI) according to the invention is an organic sulfur compound, e.g. selected from the class consisting of the thiols (mercaptans, e.g. alkylthiols, arylthiols and mercaptoheterocycles, such as mercaptoimidazoles and mercaptobenzimidazoles), ketene S, OX-acetals, where X is preferably N or S, thioacetals, sulfanes (thioethers), disulfanes (dithioethers), polysulfanes, thioamides, thioureas, thiurams (thiuram mono-, di- or polysulfides, bisthiocarbamoyl mono-, di- or polysulfanes), thiuronium salts, thiocarbamates, dithiocarbamates and the Zn, Fe, Ni, Co or Cu salts of these, thiocyanates, isothiocyanates, thiocarbonyl compounds (e.g. thioaldehydes, thioketones, thiolactones and thiocarboxylic acids), thiaheterocycles (e.g. thiophene, 1,2- or 1,3-dithiols or 1,2- or 1,3-dithiolthiones, thiazoles, mercaptothiazoles, mercaptothiadiazoles, benzodithioles or benzodithiolthiones, benzothiazoles, mercaptobenzothiazoles, phenothiazines and thianthrenes), a silane with sulfur-containing functional groups, e.g. of a mercaptoalkylalkylalkoxysilane of the general formula (5), $$(R^4O)_{3-n}R^5{}_nSi-R^6-SH \quad (5)$$

or of a bis(trialkoxysilylalkyl) mono-, di- or polysulfane of the general formula (6), or of a thiocyanatoalkyltrialkoxysilane of the general formula (7), $$[(R^7O)_3Si-R^8-]_2-S_n \quad (6)$$

$$(R^9O)_3Si-R^{10}-SCN \quad (7)$$

or a filler, preferably silica, onto which these silanes with sulfur-containing functional groups have been applied, reacted or blended, e.g. finely divided silica, and/or a thiofunctional siloxane, e.g. of a polydimethylsiloxane-co-mercaptoalkyl-, preferably -ethyl- and -propyl-, siloxane in at least one part of the multipart formulation, preferably in the part comprising the H-siloxane.

$R^4$ is preferably a substituted or unsubstituted aliphatically saturated, monovalent hydrocarbon radical having from 1 to 10 carbon atoms, preferably from 1 to 6 carbon atoms. Examples are alkyl groups such as, preferably, methyl, ethyl, propyl, butyl and hexyl, and cycloalkyl groups such as cyclopentyl, cyclohexyl and cycloheptyl.

$R^5$ is preferably a substituted or unsubstituted aliphatically saturated, monovalent hydrocarbon radical having from 1 to 10 carbon atoms, preferably from 1 to 6 carbon atoms. Examples are alkyl groups such as, preferably, methyl, ethyl, propyl, butyl and hexyl, and cycloalkyl groups such as cyclopentyl, cyclohexyl and cycloheptyl; and aryl and alkaryl groups such as phenyl, tolyl, xylyl, mesityl and benzyl.

$R^6$ is preferably a substituted or unsubstituted, aliphatically saturated, bivalent hydrocarbon radical having from 1 to 10 carbon atoms, preferably from 1 to 6 carbon atoms. Examples are alkylene groups such as, preferably, methylene, ethylene, propylene, butylene, hexylene and phenylene, most preferably propylene.

$R^7$ and $R^9$ are as defined for $R^4$.

$R^8$ and $R^{10}$ are as defined for $R^6$.

n is from 1 to 10, preferably 2 or 4.

It is also possible to use mixtures of these organic sulfur compounds.

The organic sulfur compound or its mixtures are used in amounts of from 0.0001 to 2%, preferably from 0.001 to 0.2%, particularly preferably from 0.005 to 0.15%, based on the total weight of the formulation.

The following additives may also be present in one of the components A or B.

Whereas constituents (I) and (II) and at least one hydroxyl-group-containing compound, and (V) and (VI) are necessary constituents of the novel silicone rubber composition, other additives may, if desired, be present in the silicone rubber composition in a proportion of up to 60% by weight, preferably from 1 to 20% by weight. These additives may, for example, be fillers, coupling agents, inhibitors, metal dusts, fibers, pigments, dyes, plasticizers, etc.

Examples of fillers are reinforcing fillers such as reinforcing inorganic, preferably silicatic, fillers, e.g. finely divided silica (silicic acid) with a specific surface area of from 50 to 500 m²/g, preferably from 110 to 300 m²/g, which may also have been surface-modified. These may be prepared, for example, by precipitation from solutions of silicates with inorganic acids, by hydrothermal digestion, by hydrolytic and/or oxidative high-temperature reaction of volatile silicon halides, or by an arc process. These silicas may, if desired, also be in the form of compound oxides or oxide mixtures with the oxides of the metals aluminum, magnesium, calcium, barium, zinc, zirconium and/or titanium. It is also possible to use nonreinforcing fillers, i.e. fillers with a BET specific surface area of less than 50 m²/g, such as powdered quartz, diatomaceous earth, calcium silicate, zirconium silicate, zeolites, metal oxides, such as iron oxide, zinc oxide, titanium oxide or aluminum oxide, metal carbonates, such as calcium carbonate, magnesium carbonate or zinc carbonate, metal sulfates, mica, siloxane resins, clays, lithopones, graphite or chalk. The fillers mentioned may have been hydrophobicized. Use may be made of synthetic silicates, natural silicates, glass fibers and glass-fiber products, such as mats, strands, wovens, non-wovens and the like, and also microglass beads. It is preferable to add from 10 to 60% of filler, based on the weight of the formulation.

Carbon black may be present additionally in the novel rubber compositions, not only for gray or black coloration of the vulcanizates, but also for achieving particular and useful vulcanization properties. The known rubber blacks are preferred. The carbon black may be used in amounts of from 0 to 35 parts by weight, based on 100 parts by weight of rubber, in at least one part of the multipart formulation. For the purposes of the present invention a lower limit set at zero means that the constituent of the mixture may, but does not have to, be present in the rubber mixture. If carbon black is present in a mixture the lower limit for practical purposes should be set at 0.1 parts by weight.

Examples of plasticizers are diorganopolysiloxanes which are liquid at room temperature and have been end-capped by triorganosiloxy groups, for example dimethylpolysiloxanes end-capped by trimethylsiloxy groups and having a viscosity of from 10 to 10,000 mPa·s at 25° C.

In particular, resin-like polyorganosiloxanes, which are essentially composed of units of the formulae $R^{11}{}_3SiO_{1/2}$, $R^{11}SiO_{3/2}$ and/or $SiO_{4/2}$, and if desired also $R^{12}{}_2SiO_{2/2}$, may be present in proportions of up to 50% by weight, preferably up to 20% by weight, based on the total weight of the silicone rubber. The molar ratio of monofunctional to tri- or tetrafunctional units in these resin-like polyorganosiloxanes is preferably in the range from 0.5:1 to 1.5:1. Functional groups, in particular alkenyl groups, in the form of $R^{12}R^{11}{}_2SiO_{1/2}$ and/or $R^{12}R^{11}SiO_{2/2}$ units, may also be present.

$R^{12}$ is a substituted or unsubstituted, aliphatically saturated, monovalent hydrocarbon radical having from 1 to 10 carbon atoms, preferably from 1 to 6 carbon atoms. Examples are alkyl groups such as methyl, ethyl, propyl, butyl and hexyl; cycloalkyl groups such as cyclopentyl, cyclohexyl and cycloheptyl; aryl and alkaryl groups such as phenyl, tolyl, xylyl, mesityl, benzyl, beta-phenylethyl and naphthyl, and halogen-substituted groups such as 3,3,3-trifluoropropyl, o-, p- and m-chlorophenyl, bromotolyl and beta-cyanoethyl.

$R^{13}$ is preferably an alkenyl group. The alkenyl groups selected may be any of the alkenyl groups which can undergo a hydrosilylation reaction with an SiH-functional crosslinking agent. Preference is given to the use of alkenyl groups having from 2 to 6 carbon atoms such as vinyl, allyl, methallyl, 1-propenyl, 5-hexenyl, ethyl, butadienyl, hexadienyl, cyclopentenyl, cyclopentadienyl, and cyclohexenyl, preferably vinyl or allyl.

Additives present may in particular be those which serve to set the desired processing time and crosslinking rate of the curable silicone rubber composition. Examples of these stabilizers and inhibitors known per se are: acetylenic alcohols, such as ethynylcyclohexanol and 2-methyl-3-butyn-2-ol, polymethylvinylcyclosiloxanes, such as methylvinylcyclotetrasiloxane, low-molecular-weight siloxane oils with vinyldimethylsiloxy end groups, trialkyl cyanurates, alkyl maleates, such as diallyl maleate and dimethyl maleate, alkyl fumarates, such as diethyl fumarate and diallyl fumarate, organic hydroperoxides, such as cumene hydroperoxide, tert-butyl hydroperoxide and pinane hydroperoxide, organic peroxides, benzotriazole, organic sulfoxides, organic amines and amides, phosphanes, phosphites, nitriles, diaziridines and oximes. Use may preferably be made of siloxanes, particularly preferably 1,3-divinyl-1,1,3,3-tetramethyldisiloxane and tetramethyltetravinylcyclotetrasiloxane.

The novel silicone foams are preferably produced by mixing the filler with the polyorganosiloxane (I) containing alkenyl groups to give a homogeneous mixture in a first step. A suitable mixer, e.g. a planetary mixer, is used to incorporate the filler into the polyorganosiloxane.

Components (A) and (B) are used in a weight ratio of from 10:1 to 1:0.5, preferably 1:1.

The invention also provides a process in which component (A) is mixed with component (B).

Components (A) and (B) are as defined above. The components are intimately mixed at room temperature (25° C.) and atmospheric pressure. The mixture is then vulcanized in from 12 to 72 h, preferably from 16 to 36 h, at a temperature of from 15 to 50° C., preferably from 20 to 30° C.

The invention also provides a molded article which comprises the novel compositions of the present invention or compositions prepared by the novel process of the present invention.

The novel foam molded articles are elastomeric moldings with good to very good mechanical properties which can be produced cost-effectively by the novel process. Moldings of this type may preferably be produced by metering the reactive ingredients via a mixing and metering apparatus. When subjected to deformation, moldings of this type exhibit a residual deformation, the compression set. This deformation is, in particular, very high shortly after production, i.e. if there is no post-heating. For certain applications, e.g. gaskets in the automotive and machine tool sectors, where for technical or cost reasons there is no post-heating of the parts, i.e. annealing, it is essential, in particular in the case of unannealed parts, to achieve very low compression set. The present invention achieves this objective. However, according to the invention annealing is also possible.

The vulcanized compositions which crosslink to give elastomers have a compression set of preferably less than 70, more preferably less than 50 and most preferably less than 30, where a value of 0 indicates no compression set at all. Compression set is measured in accordance with DIN 53517.

A characteristic feature of addition-crosslinking silicone rubbers is that, unlike peroxide crosslinking, there is no liberation of products eliminated during crosslinking. This favorable consistency and the principle of crosslinking give numerous processing advantages, in particular in cost-effective production of large numbers of small moldings. A significant factor for automated production is processing without post-treatment, e.g. without post-heating (annealing) of the moldings. For a wide variety of sealing applications in engineering, e.g. O-rings, valve cover gaskets, sealing lips, gaskets of any type, air-filter sealing lips, etc., low compression set is an advantage. The subject matter of the invention is of particular interest for the reasons mentioned, since the sulfur-containing additives claimed significantly improve compression set without significantly affecting other mechanical properties and/or crosslinking behavior. The low density is also of interest for many applications.

A feature which the compounds described in the prior art have in common is that they are not silicone foams containing organic sulfur compounds. The literature warns against even the smallest amounts of organic sulfur compounds in addition-crosslinking systems, since they poison the catalyst in such systems. "Ullmanns Enzyklopädie der technischen Chemie" [Ullman's Encylopedia of Industrial Chemistry], 4th edition, Vol. 21, page 525, Verlag Chemie, 1982 also indicates that the vulcanization behavior of addition systems is very sensitive to impairment by sulfur compounds, and therefore care should be taken to avoid contamination by compounds of this type. The following references and textbooks also refer to catalyst poisoning in addition systems: W. Hechtl, Chemie und Technologie des kalthärtenden Siliconkautschuks, in Silicone, Chemie und Technologie, pp. 49ff., Vulkan Verlag, 1989; Ullmann's Encyclopedia of Ind. Chem., 5th Edn., Vol. A5, p. 323, Verlag Chemie 1993, Weinheim, Germany; Ullmann's Encyclopedia of Ind. Chem., 5th Edn., Vol. A24, p. 72, Verlag Chemie 1993, Weinheim, Germany; Ullmann's Encyclopedia of Ind. Chem., 4th Edn., Vol. 21, pp. 522 and 525, Verlag Chemie 1982, Weinheim, Germany.

EXAMPLES

Example 1

Preparation of a Filler Modified with Organosulfur Compounds 10 g of water followed by 12.24 g of 3-mercaptopropyltrimethoxysilane, obtainable from Wacker Chemie as "Wacker Silan GF 70", both in finely divided form, are mixed, at room temperature and atmospheric pressure and with stirring, into 100 g of pyrogenic silica with a BET specific surface area of 300 $m^2/g$, obtainable from Wacker Chemie as "Wacker HDK T30". This is followed by annealing at 80° C. for 1 hour. Removal of reaction by-products under reduced pressure gives 106.1 g of a white powder.

Example 2

Preparation of a Batch for Improving Compression Set 43.3 parts by weight of a vinyl-end-capped polydimethylsiloxane with a viscosity of 20 Pa·s are mixed in a kneader with 20 parts by weight of a pyrogenic silica surface-modified with hexamethyldisilazane and having a BET specific surface area of 300 $m^2/g$, and processed to give a homogeneous composition. 10 parts by weight of the modified filler of Example 1 are added to this mixture, followed by homogenization at 120° C. for a further 0.5 hour. Finally, 26.7 parts by weight of vinyl-end-capped polydimethylsiloxane having a viscosity of 20 Pa·s are incorporated.

Example 3
Preparation of a Batch for Improving Compression Set 10 parts by weight of octadecane-1-thiol are stirred at above its melting point into 90 parts by weight of vinyl-end-capped polydimethylsiloxane with a viscosity of 20 Pa·s, and processed to give a homogeneous composition.

Example 4
Preparation of the Basic Mix for a Silicone Foam

Preparation of component A: 49.5% by weight of vinyl-end-capped polydimethylsiloxane having a viscosity of 20 Pa·s and 25% by weight of vinyl-end-capped polydimethylsiloxane having a viscosity of 1 Pa·s are mixed homogeneously in a planetary mixer with 14% by weight of surface-modified pyrogenic silica with a BET specific surface area of 140 m²/g. To this, the following are admixed and homogenized: 10% by weight of a hydroxyl-end-capped polydimethylsiloxane, 0.7% by weight of a platinum catalyst composed of 97% by weight of a polydimethylsiloxane and of 3% by weight of a divinyl-tetramethyldisiloxaneplatinum complex, and 0.8% by weight of a vinylpolydimethylsiloxane as inhibitor.

Preparation of component B: 33% by weight of vinyl-end-capped polydimethylsiloxane having a viscosity of 20 and 30% by weight of vinyl-end-capped polydimethylsiloxane having a viscosity of 1 Pa·s are mixed homogeneously in a planetary mixer with 12 parts by weight of surface-modified pyrogenic silica with a BET specific surface area of 140 m²/g. To this, the following are admixed and homogenized: 15 parts by weight of a hydroxyl-end-capped polydimethylsiloxane, 10% by weight of a polydimethylsiloxane-co-hydrogenmethylmethylpolysiloxane and 0.7% by weight of a vinylpolydimethylsiloxane as inhibitor.

The resultant foam components A and B are mixed in a ratio of 1:1 and vulcanized at room temperature. This may be followed by annealing for an hour at 100°C.

Example 5

Component A as in Example 4. B as in Example 4 but with 31% by weight of the vinyl-end-capped polydimethylsiloxane with a viscosity of 20 Pa·s and 2% by weight of the batch as in Example 2.

Example 6

Component A as in Example 4. Component B as in Example 4, but with 26% by weight of the vinyl-end-capped polydimethylsiloxane with a viscosity of 20 Pa·s and 7% by weight of the compression set-improving batch of Example 2.

Example 7

Component A as in Example 4. Component B as in Example 4, but with 25% by weight of the vinyl-end-capped polydimethylsiloxane with a viscosity of 20 Pa·s and 8% by weight of the compression set-improving batch of Example 2.

Example 8

Component A as in Example 4. Component B as in Example 4, but with 12% by weight of the vinyl-end-capped polydimethylsiloxane with a viscosity of 20 Pa·s and 21% by weight of the compression set-improving batch of Example 2.

Improvement of Compression Set in Silicone Foams

|  | Example 4[1] | Example 7 |
|---|---|---|
| Shore A hardness with skin | 9–11 | 9–11 |
| Shore 00 with skin | 50–55 | 50–55 |
| Ultimate tensile strength [kPa] | 350 | 350 |
| Elongation at break [%] | 100 | 120 |
| Compression set 24 h/100° C. [%] | 43 | 24 |
| Foam density [g/ml] | 0.29–0.35 | 0.29–0.35 |
| Vulcanization time t [h] at 25° C. | 24 | 24 |

| Compression set [%] | Ex. 4 | Ex. 5 | Ex. 6 | Ex. 7 | Ex. 8 |
|---|---|---|---|---|---|
| 24 h/100° C. | 42 | 30 | 25 | 24 | 21 |
| 24 h/150° C. | 80 | 67 | 59 | 51 | 48 |

[1]Example 4 is a comparative example.

DIN Specifications
 DIN 53505, ISO 868—Shore A hardness, Shore 00
 DIN 53571—Ultimate tensile strength, elongation at break
 DIN 53517—Compression set
 DIN 53420—Density

What is claimed is:

1. A composition which crosslinks to give a foamed elastomer, comprising
 a component (A) comprising a polyorganosiloxane (I) having at least two alkenyl groups per molecule, at least one hydroxyl-group-containing compound, and a metallic catalyst (V),
and
 a component (B) comprising a polyorganosiloxane (II) having at least two silicon-bonded hydrogen atoms and an organic sulfur compound (VI).

2. The composition of claim 1, wherein the compound containing at least one hydroxyl group is a polyorganosiloxane (III) having at least two hydroxyl groups per molecule.

3. The composition of claim 1, wherein the compound containing at least one hydroxyl group is a monohydric or polyhydric alcohol, water, a silanol, or other compound (IV) containing hydroxyl groups.

4. The composition of claim 1, wherein the compound containing at least one hydroxyl group is a mixture comprising a polyorganosiloxane (III) having at least two hydroxyl groups per molecule with one or more hydroxyl group-containing compounds selected from the group consisting of monohydric alcohol(s), polyhydric alcohol(s), water, silanol(s), and other compounds (IV) containing hydroxyl groups.

5. The composition of claim 1, wherein component (B) also comprises polyorganosiloxanes (I) and (III).

6. The composition of claim 1, wherein the organic sulfur compound has been applied to an inorganic filler.

7. The composition of claim 2, wherein the organic sulfur compound has been applied to an inorganic filler.

8. The composition of claim 3, wherein the organic sulfur compound has been applied to an inorganic filler.

9. The composition of claim 4, wherein the organic sulfur compound has been applied to an inorganic filler.

10. The composition of claim 5, wherein the organic sulfur compound has been applied to an inorganic filler.

11. The composition of claim 1, wherein the organic sulfur compound is 3-mercaptopropyltrimethoxysilane, 3-mercaptopropyltriethoxysilane, a polydimethylsiloxane-co-mercaptoalkyl compound, and/or octadecane-1-thiol.

12. The composition of claim 6, wherein the organic sulfur compound is 3-mercaptopropyltrimethoxysilane, 3-mercaptopropyltriethoxysilane, a polydimethylsiloxane-co-mercaptoalkyl compound, and/or octadecane-1-thiol.

13. The composition of claim 1, wherein the organic sulfur compound is present in an amount of from 0.0001 to 2% by weight, based on the total weight of the composition.

14. The composition of claim 6, wherein the organic sulfur compound is present in an amount of from 0.0001 to 2% by weight, based on the total weight of the composition.

15. The composition of claim 11, wherein the organic sulfur compound is present in an amount of from 0.0001 to 2% by weight, based on the total weight of the composition.

16. A process for preparing compositions as claimed in claim 1, comprising mixing component (A) with component (B).

17. A molding comprising the crosslinked product of the composition of claim 1, wherein the molding has not been annealed.

18. A molding comprising the product produced by the process of claim 16.

19. The composition of claim 17, wherein the vulcanized, unannealed composition has low compression set.

20. The composition of claim 18, wherein the vulcanized, unannealed composition has low compression set.

* * * * *